US010092788B2

(12) United States Patent
O'Brien et al.

(10) Patent No.: US 10,092,788 B2
(45) Date of Patent: Oct. 9, 2018

(54) SLACKLINE ACTIVITY DEVICE

(71) Applicant: BRAND 44 TRADING LLC, Denver, CO (US)

(72) Inventors: Ed O'Brien, Denver, CO (US); Amanda Lacy, Portland, ME (US)

(73) Assignee: Brand 44 Trading LLC, Denver, CO (US)

( * ) Notice: Subject to any disclaimer, the term of this patent is extended or adjusted under 35 U.S.C. 154(b) by 326 days.

(21) Appl. No.: 15/175,690

(22) Filed: Jun. 7, 2016

(65) Prior Publication Data

US 2017/0319887 A1 Nov. 9, 2017

(51) Int. Cl.

| | |
|---|---|
| ***A63B 7/02*** | (2006.01) |
| ***A63B 7/00*** | (2006.01) |
| ***A63G 31/00*** | (2006.01) |
| *A63B 7/08* | (2006.01) |
| *F16B 45/02* | (2006.01) |

(52) U.S. Cl.

CPC .................. *A63B 7/00* (2013.01); *A63B 7/02* (2013.01); *A63G 31/00* (2013.01); *A63B 7/085* (2013.01); *A63B 2210/50* (2013.01); *A63B 2225/09* (2013.01); *F16B 45/02* (2013.01)

(58) Field of Classification Search

CPC .................................................. A63B 2225/09

See application file for complete search history.

(56) References Cited

U.S. PATENT DOCUMENTS

| | | | | |
|---|---|---|---|---|
| 69,956 A | 10/1867 | Bacon | | |
| 98,587 A | 1/1870 | Hanlon | | |
| 795,677 A | 7/1905 | Austin | | |
| 1,046,329 A | 12/1912 | Reach | | |
| 1,506,668 A | 8/1924 | Rose et al. | | |
| 2,489,971 A | 11/1949 | Mitchell | | |
| 3,521,848 A | 7/1970 | Aase | | |
| 4,519,509 A | 5/1985 | Doyle | | |
| 4,846,430 A | 7/1989 | Ke | | |
| 6,196,511 B1 | 3/2001 | Beauchemin | | |
| 6,280,342 B1 | 8/2001 | Tod | | |
| 6,298,944 B1 | 10/2001 | Forbes et al. | | |
| 6,322,483 B1 * | 11/2001 | Rotella | A63B 21/0552 | 482/121 |
| 6,908,418 B2 * | 6/2005 | Saure | A63B 21/0552 | 482/121 |
| 7,552,904 B2 | 6/2009 | Zehnder et al. | | |
| 7,976,445 B2 * | 7/2011 | Lalaoua | A63B 21/4005 | 482/121 |
| D654,124 S * | 2/2012 | Davis | D21/662 | |
| 8,152,703 B1 | 4/2012 | Hinds et al. | | |

(Continued)

*Primary Examiner* — Garrett Atkinson

(74) *Attorney, Agent, or Firm* — Westerman, Hattori, Daniels & Adrian, LLP

(57) ABSTRACT

Disclosed is a slackline activity device including a main line and an anchor line configured to be tautly connected to each other and suspended between fixed objects. The mainline includes two webbings which form pockets. The pockets are locations where the two webbings are not in contact with either other, surrounded by two locations where the webbings are in contact with each other. The pockets may be formed by the webbings being fixed to each other or being woven together. Hangers, such as carabineers, are inserted into the pockets, and activity devices are suspended therefrom. Such a device may be used for recreation and exercise.

21 Claims, 19 Drawing Sheets

(56) References Cited

U.S. PATENT DOCUMENTS

| | | | | |
|---|---|---|---|---|
| 8,393,100 | B1 | 3/2013 | Hrehoriak | |
| 8,821,359 | B1 * | 9/2014 | Kassel | A63B 21/0442 482/121 |
| 8,986,178 | B2 * | 3/2015 | Klopman | A63B 7/085 482/142 |
| 9,005,090 | B2 | 4/2015 | Latronica | |
| 9,220,966 | B2 * | 12/2015 | Garner | A63B 69/187 |
| 9,339,682 | B2 * | 5/2016 | Braier | A63B 21/0442 |
| 9,427,622 | B2 * | 8/2016 | Thrasher-Rudd | A63B 7/00 |
| 9,480,865 | B2 * | 11/2016 | Naylor | A62B 35/00 |
| 9,545,533 | B2 * | 1/2017 | Boyer | A63B 69/0093 |
| 9,630,043 | B2 * | 4/2017 | Foster | A63B 21/0023 |
| 9,636,535 | B2 * | 5/2017 | Schleiden, II | A63B 21/0442 |
| 9,732,956 | B2 * | 8/2017 | Benedict | F21V 33/008 |
| 9,764,175 | B2 * | 9/2017 | Klopman | A63B 7/085 |
| 9,962,588 | B2 * | 5/2018 | Allington | A62B 1/08 |
| 2004/0087420 | A1 * | 5/2004 | Montesquieux | A63B 21/0552 482/129 |
| 2004/0215114 | A1 * | 10/2004 | Cruz | A61H 11/00 601/132 |
| 2007/0078014 | A1 | 4/2007 | Nye et al. | |
| 2009/0075788 | A1 * | 3/2009 | Hetrick | A63B 21/0023 482/91 |
| 2012/0238421 | A1 * | 9/2012 | Klopman | A63B 7/085 482/142 |
| 2012/0329620 | A1 | 12/2012 | White et al. | |
| 2013/0165301 | A1 * | 6/2013 | Thrasher-Rudd | A63B 7/00 482/129 |
| 2013/0178299 | A1 | 7/2013 | Kopp et al. | |
| 2013/0240298 | A1 * | 9/2013 | Naylor | A62B 35/00 182/231 |
| 2014/0171276 | A1 | 6/2014 | Strachan | |
| 2015/0189429 | A1 | 7/2015 | Brown | |
| 2016/0089577 | A1 * | 3/2016 | Boyer | A63B 69/0093 472/135 |
| 2016/0245503 | A1 * | 8/2016 | Benedict | F21V 33/008 |
| 2016/0325130 | A1 * | 11/2016 | Grund | A63B 7/085 |
| 2018/0185690 | A1 * | 7/2018 | Coulter | A63B 7/00 |

* cited by examiner

SLACKLINE ACTIVITY DEVICE

BACKGROUND OF THE INVENTION

Field of the Invention

The invention relates to a slackline activity device, in particular, a device which is reconfigurable with multiple attachments.

Description of Related Art

Slacklines are an increasingly popular recreational device. In a conventional slackline, an anchor line and a main line, each formed of an elongated webbing, are each attached to a fixed object, such as a tree or a pole. The anchor line and the main line are attached to each other by a tightening device such as a ratchet and are tightened, such that the slackline is elevated above the ground. After the anchor line and main line forming the slackline are taut, a user may walk on the slackline for exercise and recreation. For example, a user may walk on the slackline in a manner similar to a gymnastics balance beam. However, the types of activities which can be performed on such a conventional slackline are somewhat limited.

SUMMARY OF THE INVENTION

A slackline activity device is disclosed which has a greater flexibility as to the types of activities that can be performed by the user. The disclosed slackline activity device includes a main line and an anchor line configured to be tautly connected to each other and suspended between fixed objects. The mainline includes two webbings which form pockets. The pockets are locations where the two webbings are not in contact with either other, surrounded by two locations where the webbings are in contact with each other. The pockets may be formed by the webbings being fixed to each other or being woven together. Hangers, such as carabineers, are inserted into the pockets, and activity devices are suspended therefrom. Such a device may be used for recreation and exercise.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
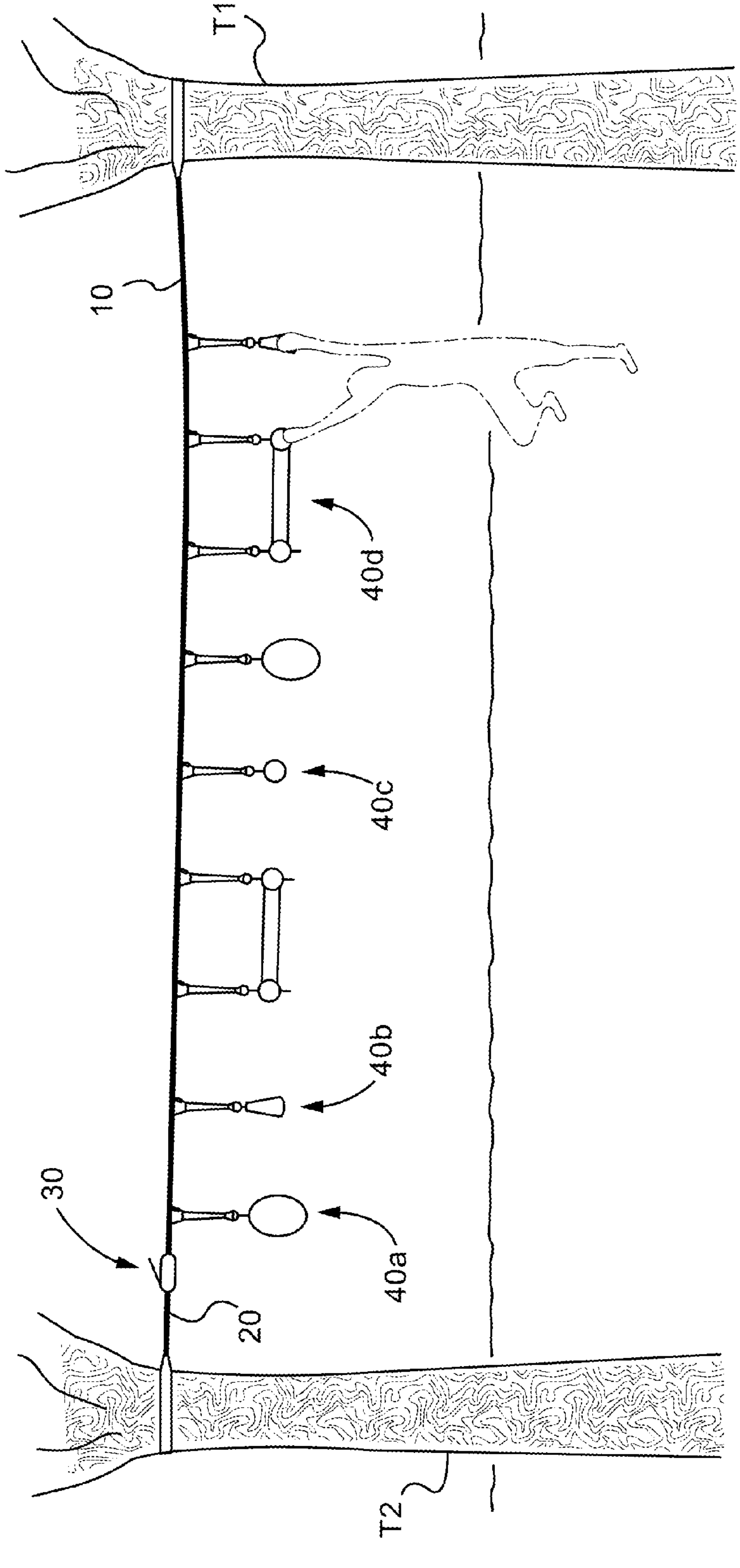
FIG. 1 is a view illustrating the slackline activity device in use.
Figure 2A:
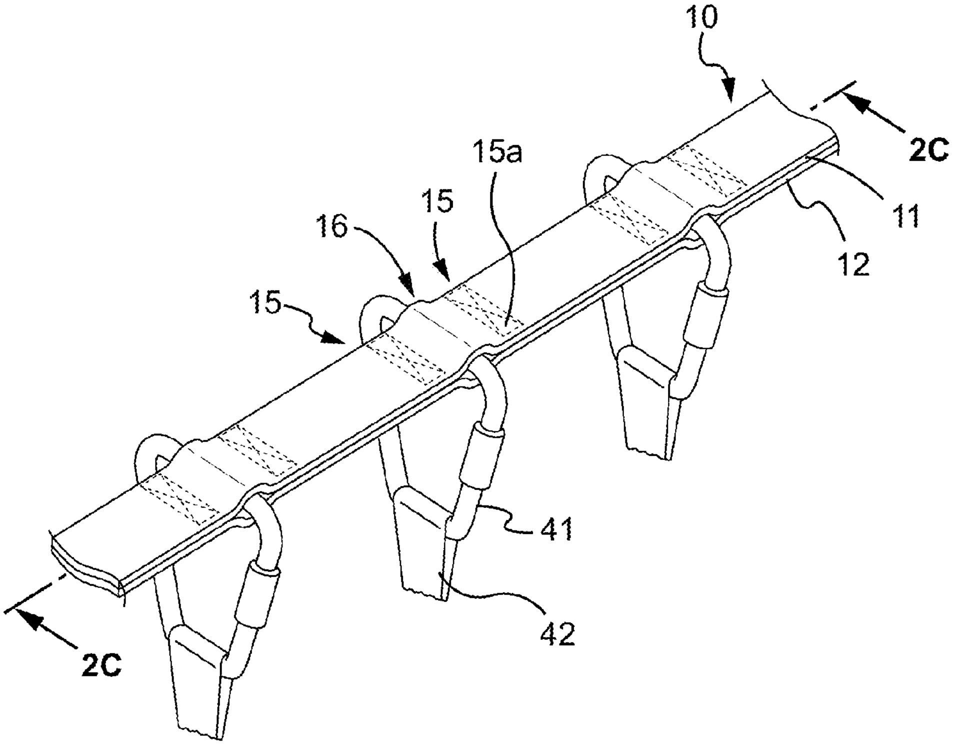
FIG. 2A is a perspective view illustrating a close up of the pockets and hangers of the mainline of the slackline activity device.
Figure 2B:
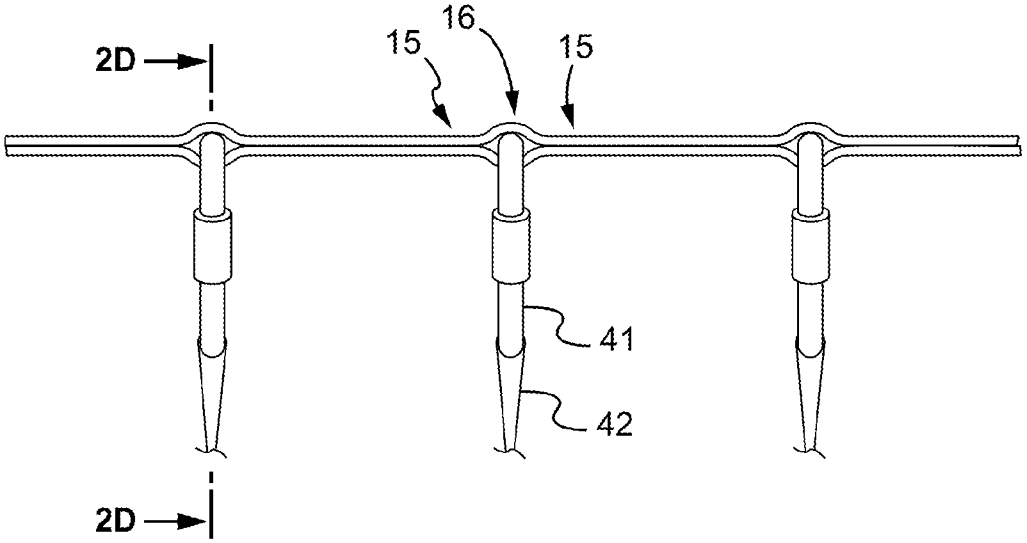
FIG. 2B is a side elevation view thereof.
Figure 2C:
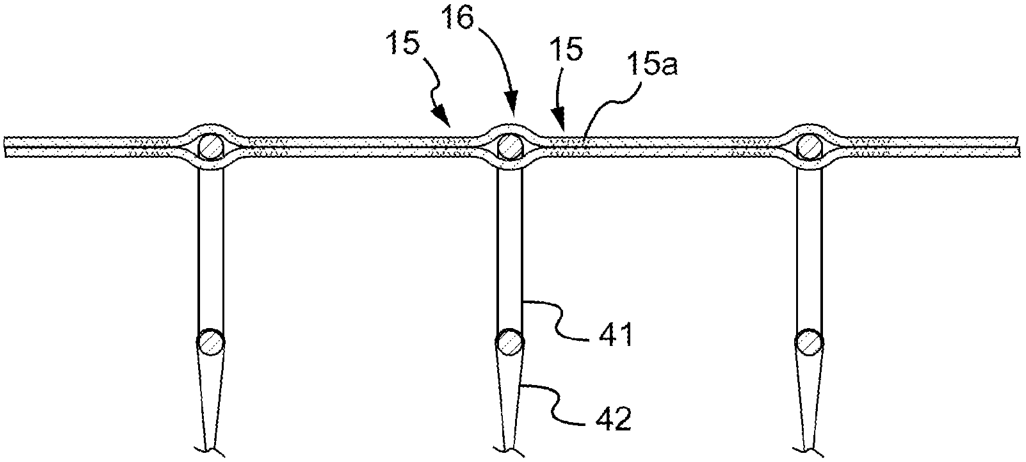
FIG. 2C is a cross-sectional view taken along the line 2C-2C illustrated in FIG. 2A.
Figure 2D:
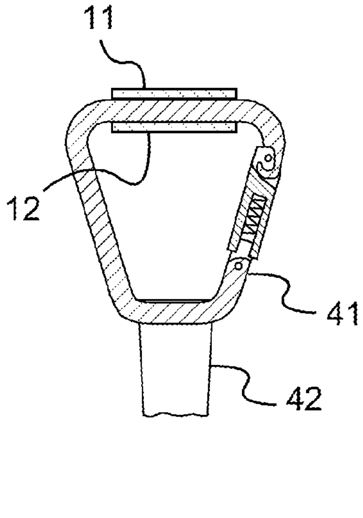
FIG. 2D is a cross-sectional view taken along the line 2D-2D illustrated in FIG. 2B.
Figure 3:
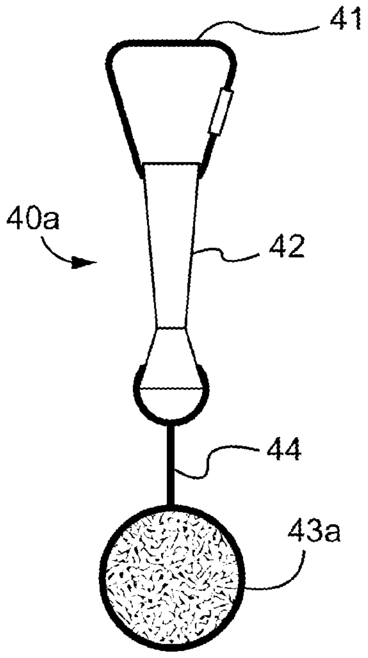
FIG. 3A is a side elevation view illustrating an activity device including a ball.
FIG. 3B is a side elevation view illustrating an activity device including a cone.
FIG. 3C is a side elevation view illustrating an activity device including a gymnastics ring.
FIG. 3D is a side elevation view illustrated an activity device including a bar.
Figure 3B:
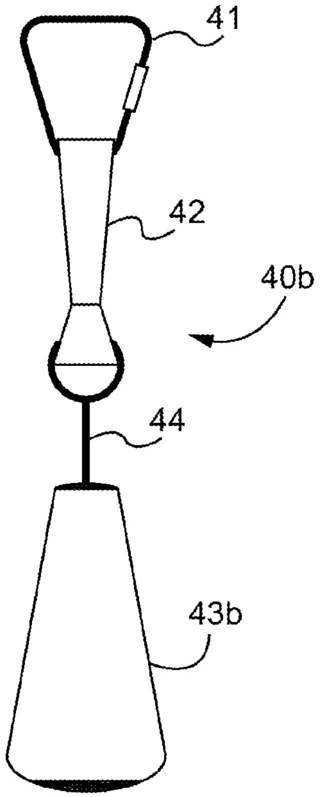
Figure 3C:
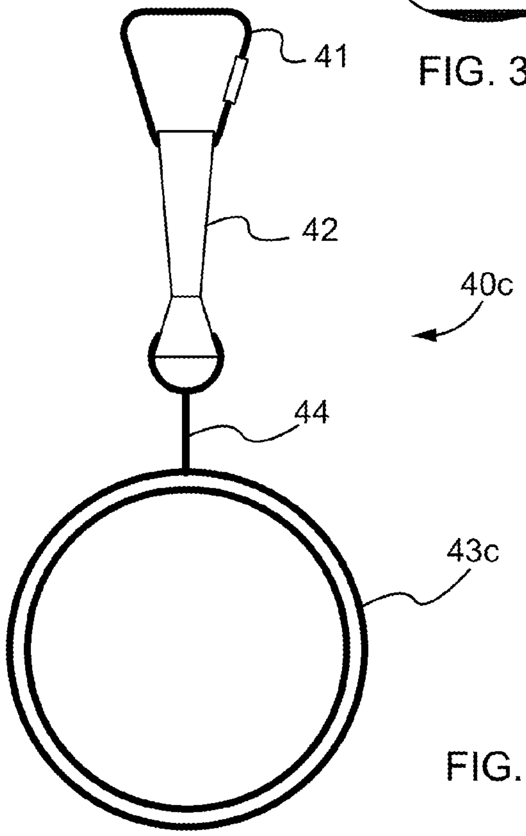
Figure 3D:
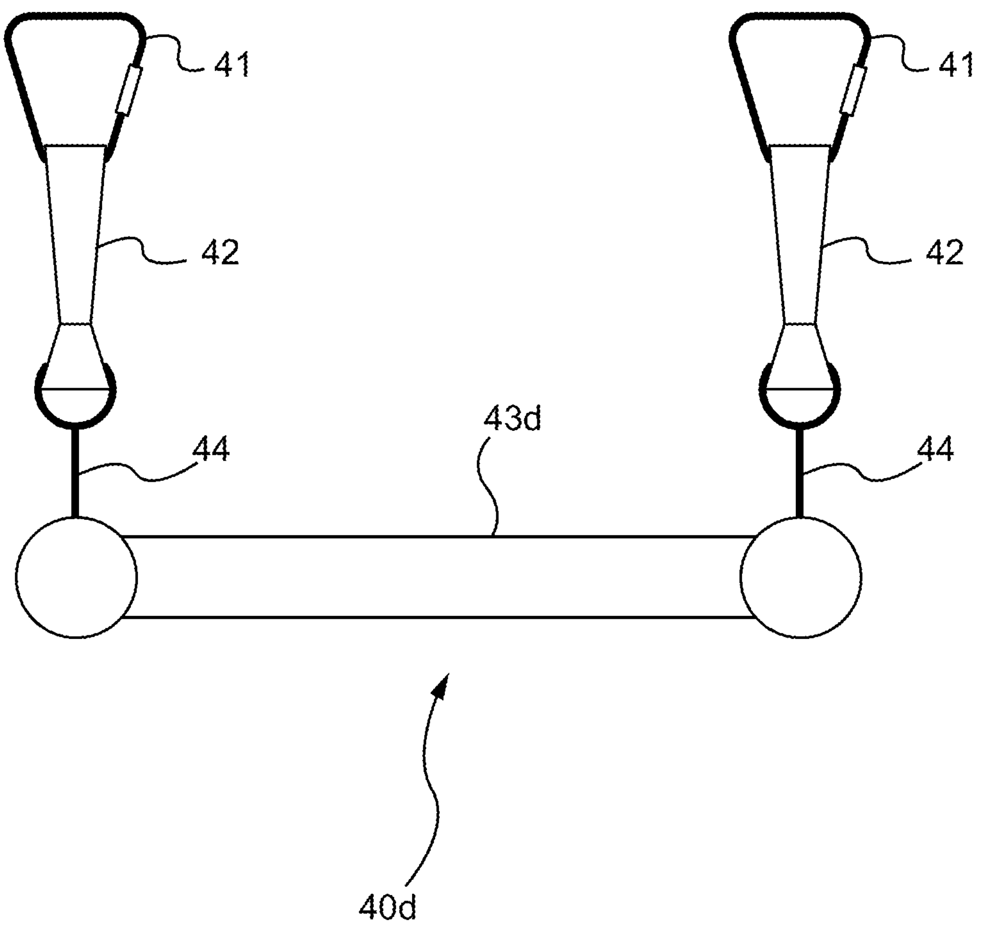

As illustrated in FIG. 1, a slackline activity device includes a main line 10 and an anchor line 20. The main line 10 may be secured to a fixed object such as a tree T1, while the anchor line 20 may be secured to another fixed object such as a tree T2. Although trees are illustrated as a fixed object, the fixed object may be an object other than a tree, such as a pole, post, a bracket fixed to a wall, or the like. The main line 10 and the anchor line 20 can be secured to each other by ratchet 30, so as to be taut. The details of the attachment procedure of the main line 10 and anchor line 20 to the fixed objects such as trees T1 and T2 will be described in greater detail below. Additionally, one or more activity apparatuses 40*a*, 40*b*, 40*c*, 40*d*, etc. are suspended from the main line 10.

As shown in FIGS. 2A-2D, the main line 10 includes two webbings 11 and 12. The two webbings 11 and 12 may have the same length or different lengths, as long as they are at least partially overlapping. For example, the webbing 12 may have a shorter length than webbing 11. For example, in one embodiment, the webbing 12 is approximately 22 feet in length while the first webbing 11 is approximately 30 feet in length. Additionally, the webbings 11 and 12 may have the same or different widths. For example, the webbing 12 may have a smaller width than the webbing 11. However, in the embodiment illustrated in FIGS. 2A-2D, in at least one portion of the main line 10, the webbings 11 and 12 have identical widths.

The main line 10 is formed so to include one or more pockets 16. The pockets 16 are each a region where the two elongated webbings 11 and 12 are in not contact with each other, surrounded by two regions 15 where the two elongated webbings 11 and 12 are in contact with each other. For instance, in the region where the webbings 11 and 12 are in contact with each other, the webbings 11 and 12 may be fixed to each other. As shown in FIGS. 2A-2D, in the regions 15 in which the webbings 11 and 12 are fixed to each other, the webbings 11 and 12 may be sewn together by sewing thread 15*a*. However, the webbings 11 and 12 may be fixed to each other in the regions 15 in other ways, such as by rivets, clamps, brackets, adhesive or the like. Typically, the main line 10 will include a plurality of pockets 16. There is no limitation of the spacing or number of the pockets 16. However, the pockets 16 are typically spaced such that there is a gap of approximately 12 to 24 inches between each pocket 16.

The activity apparatuses 40*a*, 40*b*, 40*c*, 40*d*, etc. each include a hanger 41. Note that in FIGS. 2A-2D, other portions of the activity apparatuses 40*a*, 40*b*, 40*c*, 40*d*, etc. below the strap 42 are omitted for simplicity. As shown in FIGS. 2A-2D, a hanger 41 is inserted into the pocket 16. The hanger 41 may have any shape, as long as it can be securely held in the pocket 16. For instance, the hanger 41 may be a closed loop which has a shape which is substantially circular, oval, triangular or rectangular shape. The hanger 41 may be removable from the pocket 16. For example, the hanger 41 may be a conventional carabiner device. A conventional carabiner has an approximately C-shape with a spring-loaded portion closing the C-shape, such that the carabiner has an approximately oval or rectangular shape when closed. If a removable hanger 41 such as a carabiner is used, then the activity apparatus 40*a*, 40*b*, 40*c*, 40*d*, etc. can be easily removed from the main line 10.

Figure 13:
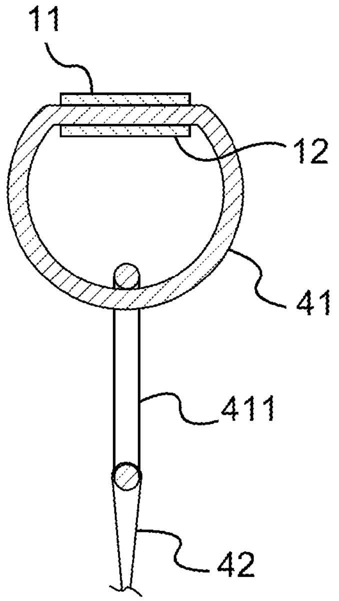
FIG. 13 is a cross-sectional view illustrating an embodiment with a non-removable hanger.

As an alternative, the hanger 41 can be non-removable. For example, as illustrated in FIG. 13 which is a cross-sectional view similar to FIG. 2D, a non-removable hanger 41 can be a substantially circular ring which cannot be opened. In the case of a non-removable hanger 41, the main line 10 must be formed by placing the non-removable hanger 41 in the pocket 16 before it is formed, for example by fixing the webbings 11 and 12 to each other in the regions 15. In the case of a non-removable hanger 41, an intervening additional hanger 411 may interpose the non-removable hanger 41 and the strap 42 of the activity apparatuses 40*a*, 40*b*, 40*c*, 40*d*, etc. For instance, a conventional carabiner may interpose the hanger 41 and the strap 42 of the activity apparatuses 40*a*, 40*b*, 40*c*, 40*d*, etc. Accordingly, even if the hanger 41 is non-removable, the activity apparatuses 40*a*, 40*b*, 40*c*, 40*d*, etc. can be removable. According to this embodiment, the user does not need to insert and remove the hangers 41 into the pocket 16, but can reconfigure the activity apparatuses while keeping the hangers 41 in place.

Figure 11A:
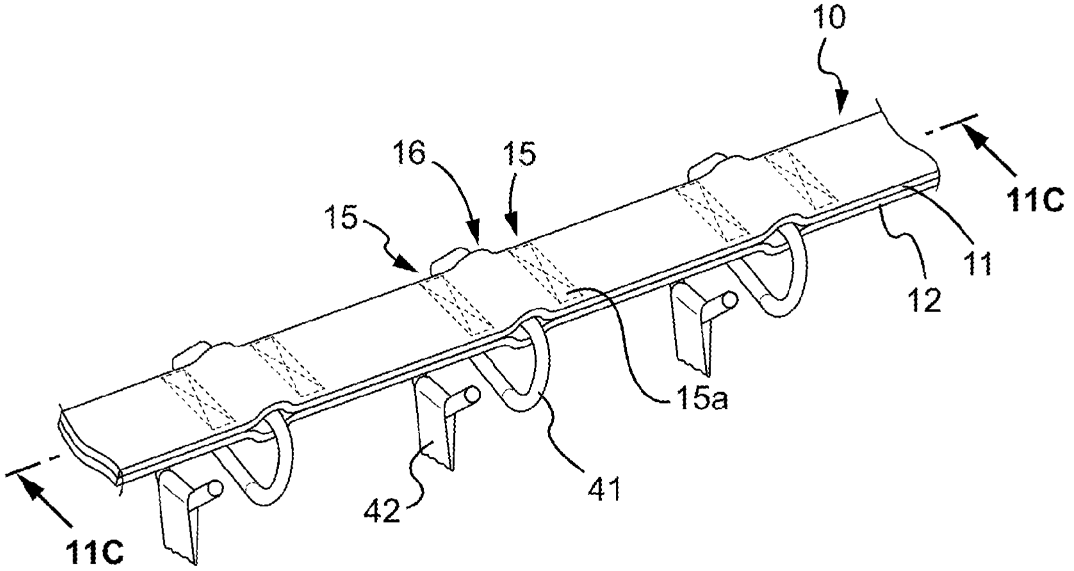
FIG. 11A is a perspective view illustrating a close up of the pockets and hangers of the mainline of the slackline activity device using the hangers of another embodiment.
Figure 11B:
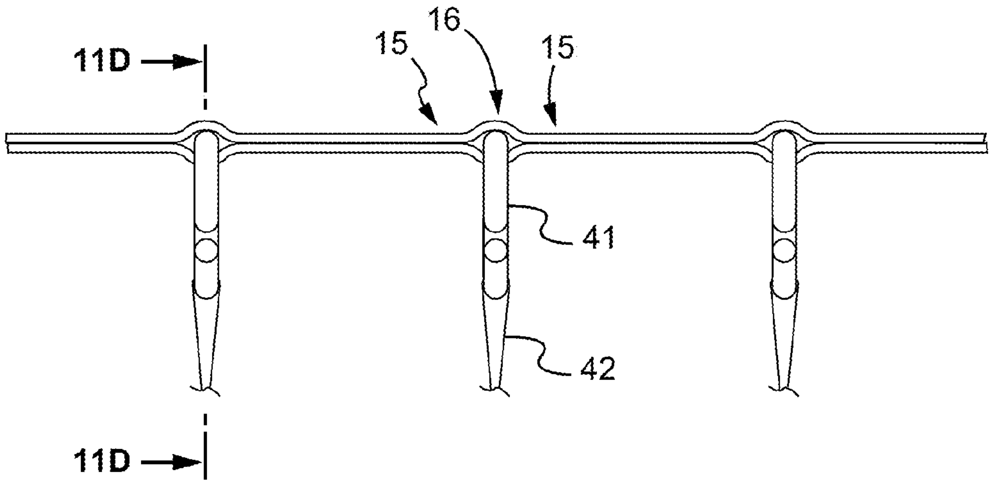
FIG. 11B is a side elevation view thereof.
Figure 11C:
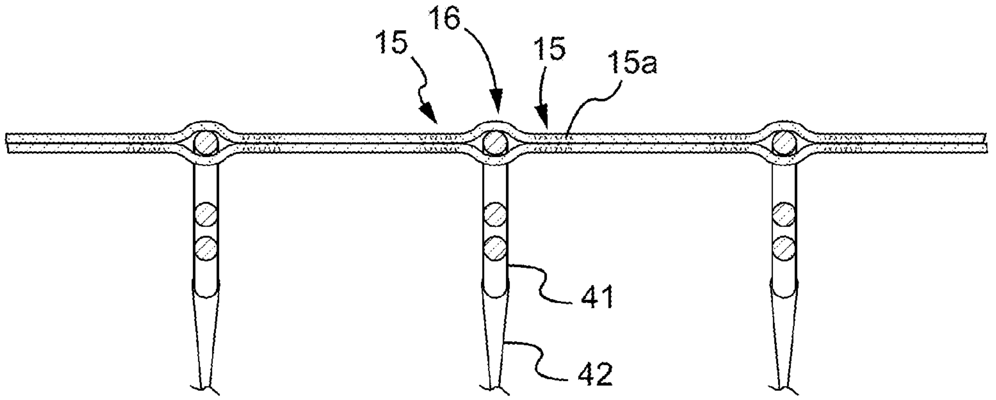
FIG. 11C is a cross-sectional view taken along the line 11C-11C illustrated in FIG. 11C.
Figure 11D:
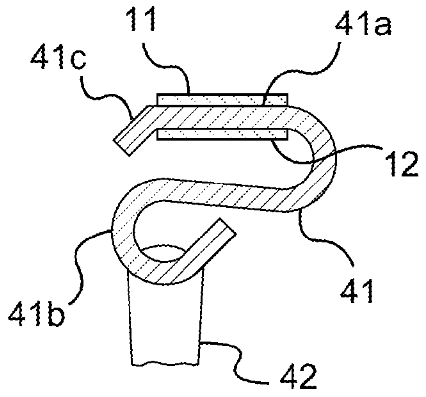
FIG. 11D is a cross-sectional view taken along the line 11D-11D in FIG. 11B.
Figure 11E:
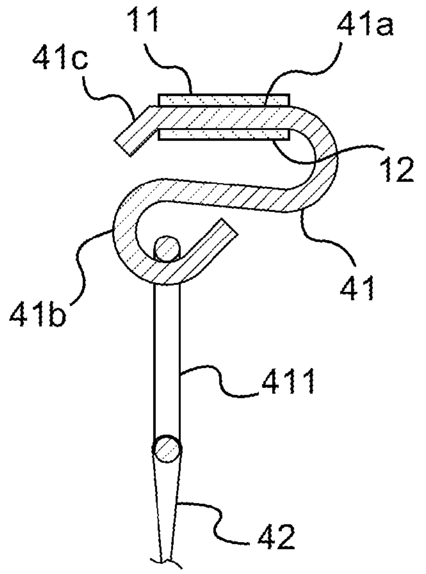
FIG. 11E is a modified cross-sectional view of FIG. 11D employing an intervening hanger.
Figure 12:
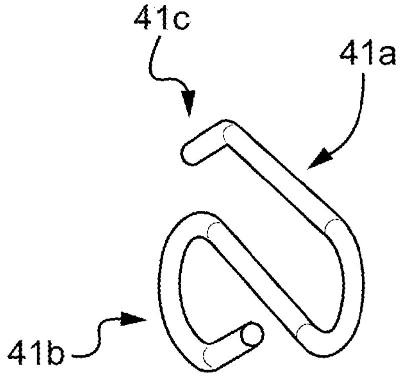
FIG. 12 is a view of a hanger of another embodiment of the slackline activity device.

It is further noted that the hanger 41 need not be a closed shape such as a loop or carabiner. For example, as illustrated in FIGS. 11A-11E and 12, the hanger 41 could be a hook having an approximately S-shape which can be removably inserted into the pocket 16. In particular, the S-shaped hanger 41 can have an inserting portion 41*a* which is removably inserted into the pocket 16, and an attaching portion 41*b* to which the strap 42 of the activity apparatuses 40*a*, 40*b*, 40*c*, 40*d*, etc. can be attached. A terminal portion 41*c* adjacent to the inserting portion 41*a* acts to retain the S-shaped hanger 41 in the pocket 16. As shown in FIG. 11E, an intervening additional hanger 411, such as a carabineer, can intervene the strap 42 and the attaching portion 41*b*.

Figure 7A:
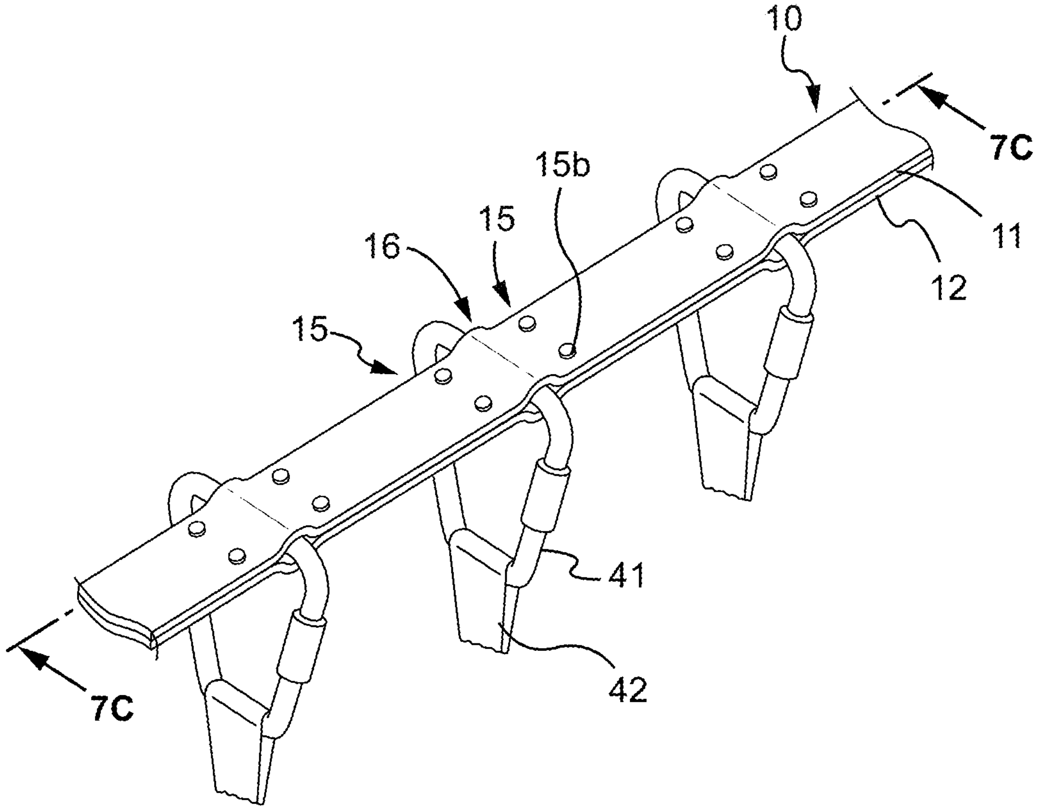
FIG. 7A is a perspective view illustrating a close up of the pockets and hangers of another embodiment of the mainline of the slackline activity device.
Figure 7B:
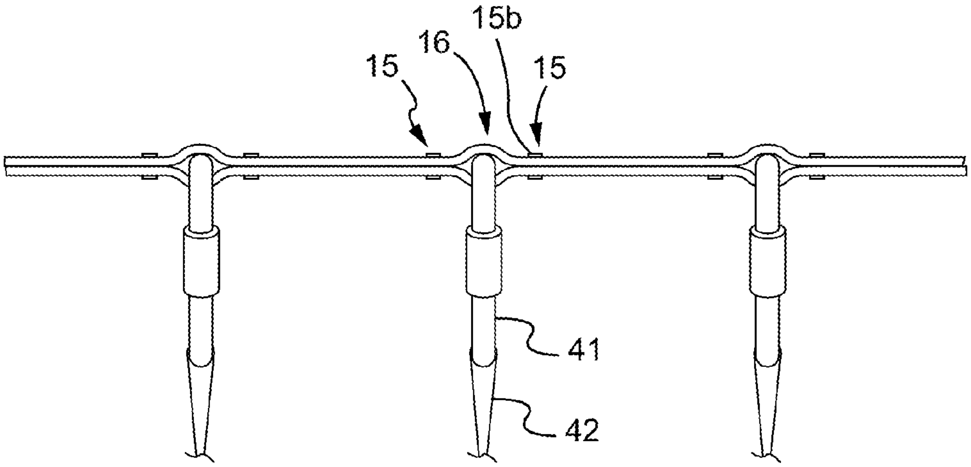
FIG. 7B is a side elevation view thereof.
Figure 7C:
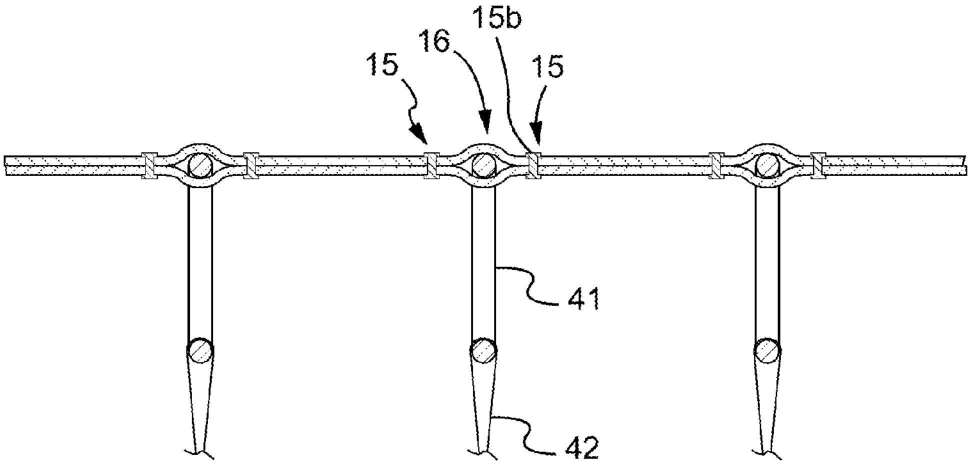
FIG. 7C is a cross-sectional view taken along the line 7C-7C illustrated in FIG. 7A.
Figure 8A:
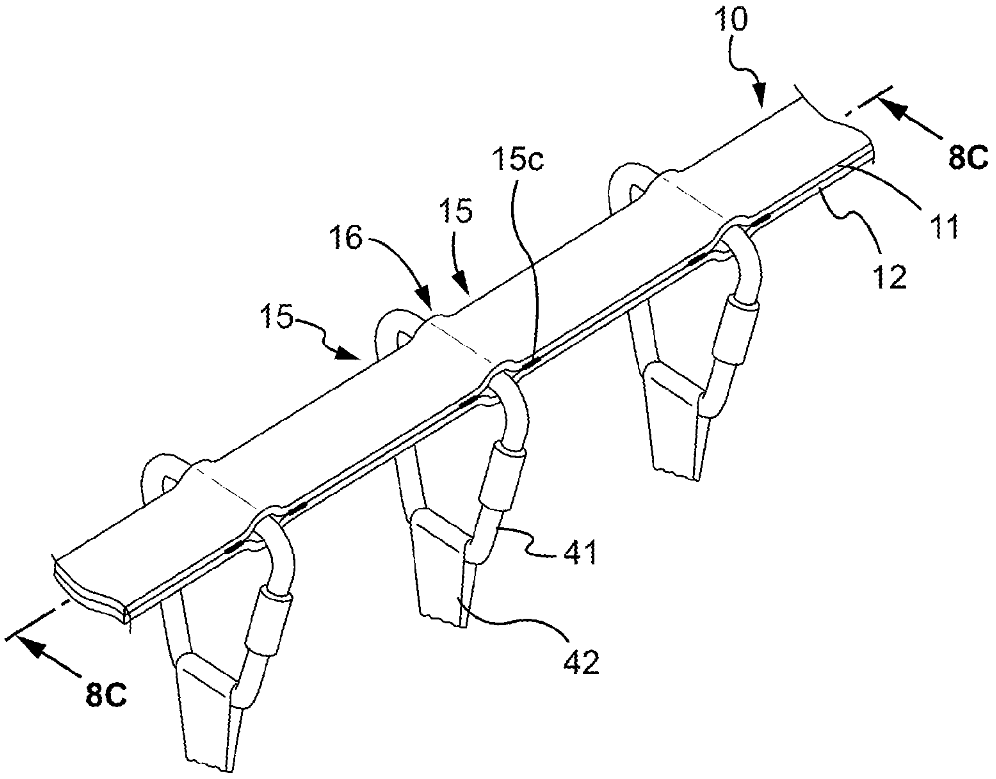
FIG. 8A is a perspective view illustrating a close up of the pockets and hangers of another embodiment of the mainline of the slackline activity device.
Figure 8B:
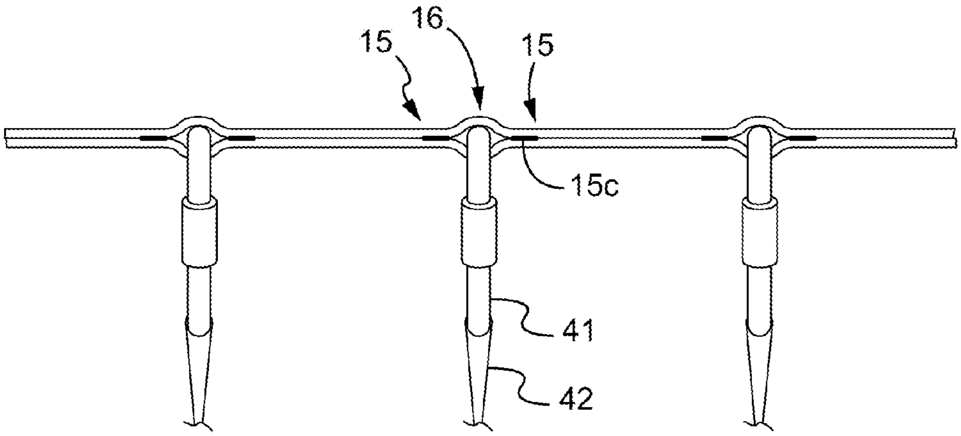
FIG. 8B is a side elevation view thereof.
Figure 8C:
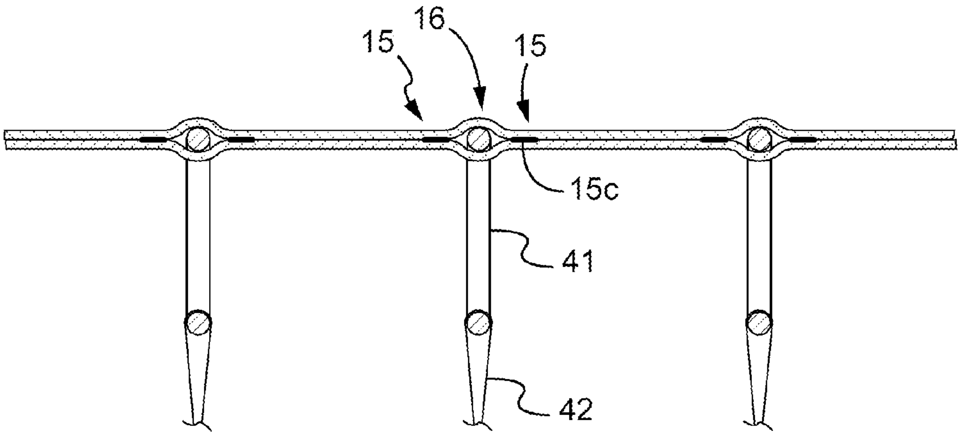
FIG. 8C is a cross-sectional view taken along the line 8C-8C illustrated in FIG. 8A.

As noted above, although the webbings 11 and 12 in regions 15 may be fixed to each other by a sewing thread 15*a*, other configurations are possible. For instance, FIGS. 7A-7C illustrate an embodiment where the webbings 11 and 12 in regions 15 are fixed to each other by rivets 15*b*. The number of rivets 15*b* is not particularly limited, although it is preferable to have two rivets in each region 15. As another alternative, FIGS. 8A-8C illustrate an embodiment where the webbings 11 and 12 in regions 15 are fixed to each other by adhesive 15*c*. The composition of the adhesive 15*c* is not particularly limited, as long as it is capable of fixing webbings 11 and 12 to each other.

Furthermore, it is noted that in all embodiments, the hanger 41 may be formed of any material which is strong enough to support the weight of a typical user, which is between 20 and 250 pounds. For example, the hanger 41 may be formed of a metal such as aluminum, steel, or alloys thereof, wood, a resin, fabric, or the like.

As shown in FIG. 1, the activity apparatuses 40*a*, 40*b*, 40*c*, 40*d*, etc. include not only the hanger 41, but objects suspended from the hanger 41. Examples are illustrated in FIGS. 3A-3D. However, these examples are non-limiting, and other activity apparatuses may be used. For example, in FIG. 3A, the activity apparatus 40*a* includes a hanger 41, a ball 43*a*, an eyelet ring 44 fixed to a ball 43*a*, and a strap 42 connecting the hanger 41 and the eyelet ring 44. As another example, in FIG. 3B, the activity apparatus 40*b* includes a hanger 41, a cone 43*b*, an eyelet ring 44 fixed to the cone 43*b*, and a strap 42 connecting the hanger 41 and the eyelet ring 44. As another example, in FIG. 3C, the activity apparatus 40*c* includes a hanger 41, a gymnastics ring 43*c*, an eyelet ring 44 fixed to the gymnastic ring 43*c*, and a strap 42 connecting the hanger 41 and the eyelet ring 44. As another example, in FIG. 3D, the activity apparatus 40*d* includes two hangers 41 and thus will preferably be attached to two pockets 16. The activity apparatus 40*d* further includes a bar 43*d*, eyelet rings 44 fixed to each end of the bar 43*d*, and straps 42 connecting the hangers 41 and the eyelet rings 44. In the above-described activity apparatuses, the ball 43*a*, cone 43*b*, gymnastics ring 43*c* and bar 43*d* may be formed of any material, such as wood, metal, resin, fabric, or the like.

In FIGS. 3A-3D, the hanger 41 is a carabiner. As such, the activity apparatuses 40*a*, 40*b*, 40*c*, 40*d*, etc. are entirely removable from the main line 10. Accordingly, the user may mix and match different types of activity apparatuses and reconfigure these for maximum recreation and exercise benefits.

Figure 10:
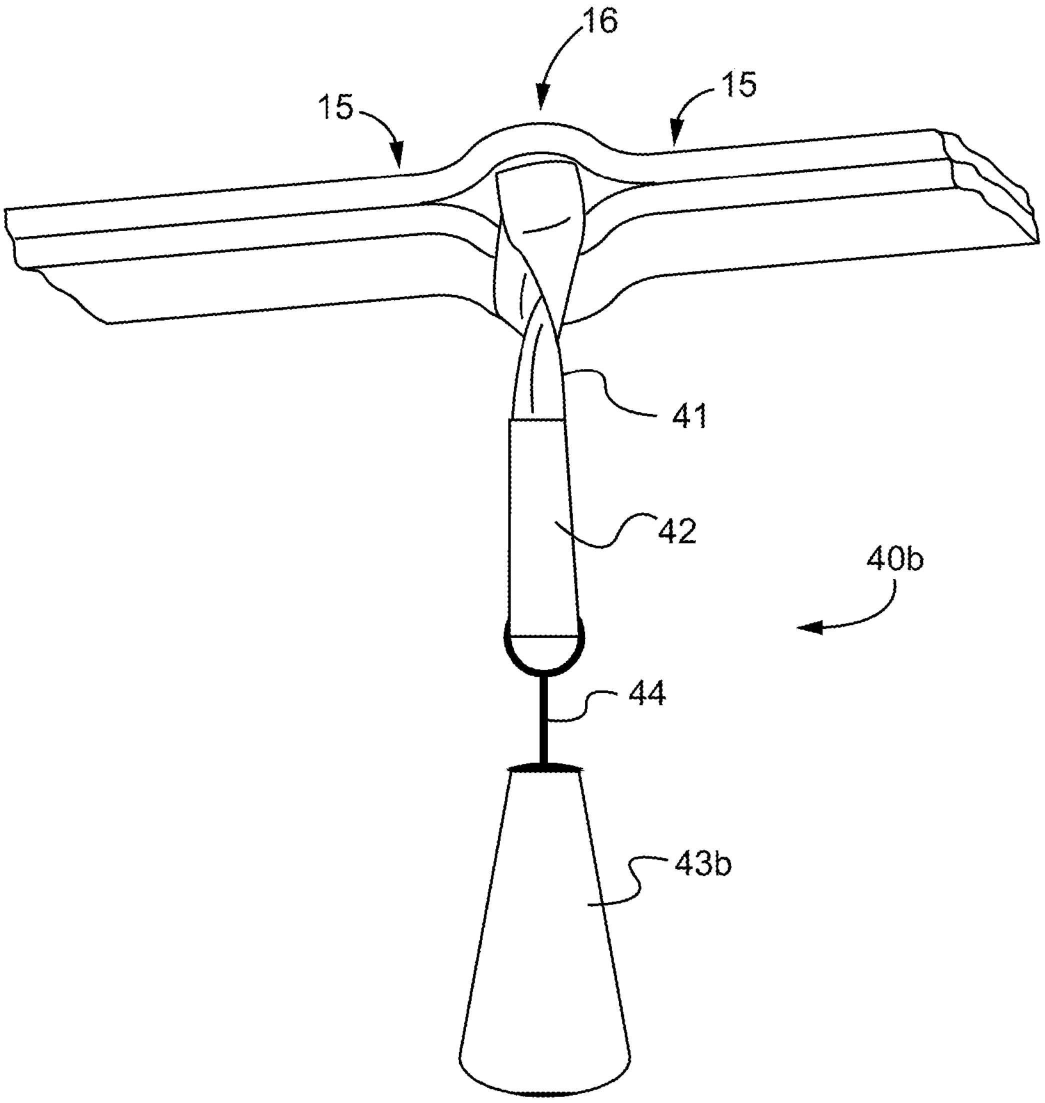
FIG. 10 is a perspective view illustrating another embodiment of the hanger disposed in the pockets of the mainline of the slackline activity device.

As another embodiment, as illustrated in FIG. 10, the hanger 41 may be a fabric material. In such a case, the hanger 41, which is a fabric material, may be formed so as to be either integral with the strap 42 or may be fixed to the strap 42 via a suitable attachment mechanism such as sewing, rivets or the like. In an embodiment where the hanger 41 and strap 42 are integral, one end of the combined fabric hanger 41 and strap 42 is fixed to the eyelet ring 44, and the other end is fed through the pocket 16 so as to tie the activity apparatus 40*b* to the main line 10.

The type of activity apparatus is not limited. For example, an activity apparatus may include a fabric knot, a vertical rod, or a horizontal bar which is connected to a hanger 41 on each end thereof. In other embodiments, the activity apparatus could include other objects, such as a swing, a hanging tent, a sheet of games, or a climbing rope.

Figure 9:
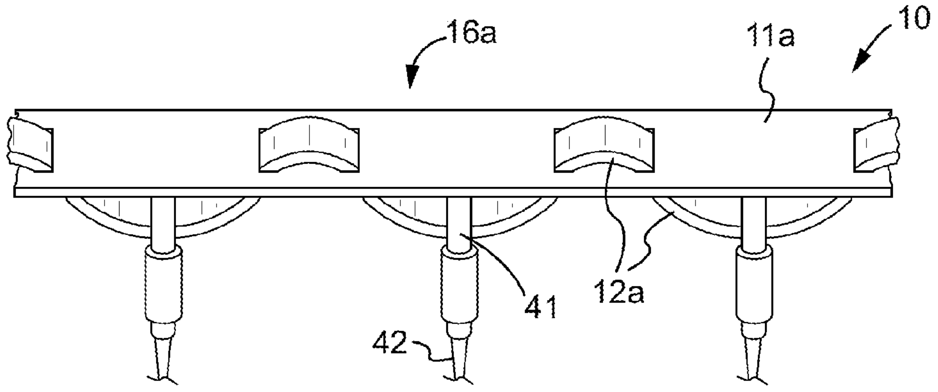
FIG. 9A is a perspective view of another embodiment of the mainline of the slackline activity device.
FIG. 9B is a side elevation view thereof.
FIG. 9C is a plan view of a portion of one webbing of the mainline of the slackline activity device according to this embodiment.
Figure 9B:
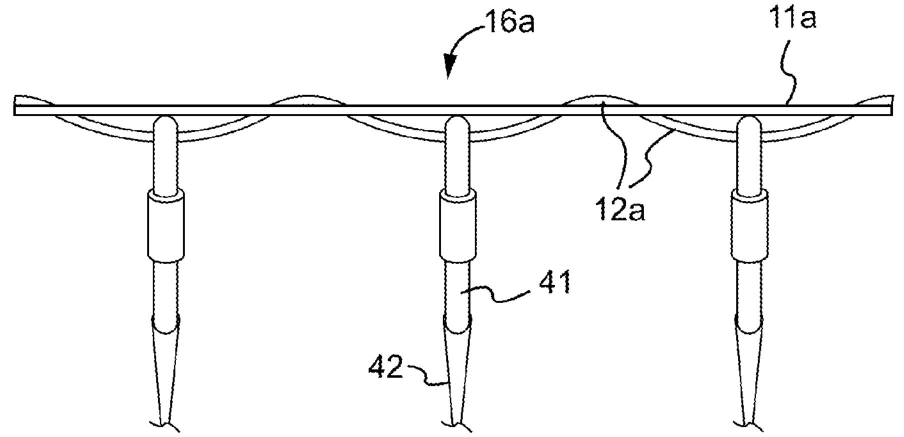
Figure 9C:
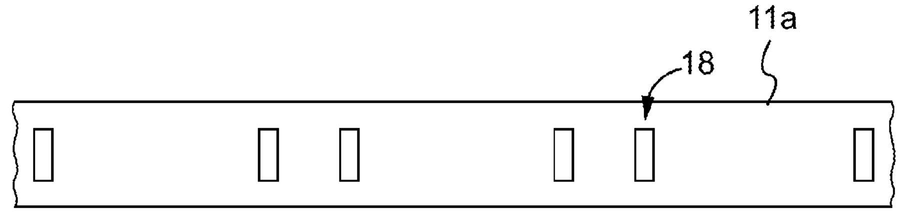

Next, another embodiment of the main line 10 is discussed. As illustrated in FIGS. 9A-9C, the main line 10 may also be formed by webbings 11*a* and 12*b* which are woven together. In this embodiment, it is necessary for one of the webbings to have a smaller width than the other. As shown in FIGS. 9A and 9B, the webbing 12*a* has a smaller width than the webbing 11*a*. Additionally, as shown in FIG. 9C, the webbing 11*a* has a plurality of slits 18 formed therein arranged along the length of the webbing 11*a*. Note that in FIG. 9C, the size and shape of the slits 18 are exaggerated for explanatory purposes. Additionally, the spacing of the slits 18 is not limited to that illustrated in FIG. 9C. In order to improve durability, the edges of the slits 18 can be reinforced by known means such as sewing. The weaving of webbing 12*a* through the slits 18 in the webbing 11*a* forms a plurality of pockets 16*a*. A hanger 41 may be inserted into these pockets 16 in the manner discussed above.

Next, installation of the device will be described, with reference to FIGS. 4A-4E. Typically, the main line 10 has a loop 10*a* on the first end and the second end 10*b* is free, and the anchor line 20 has a loop 20*a* on a first end and a ratchet 30 on the second end 20*b*. The manner in which the ratchet 30 is fixed to the second end 20*b* is not particularly limited. However, typically, the second end 20*b* has a loop, and a bolt of the ratchet 30 is passed through the loop. It is noted that the specific construction of the ratchet 30 is not particularly limited. However, typically, the ratchet 30 is similar in construction to a ratchet of a tie-down strap system used to secure cargo.

Figure 4A:
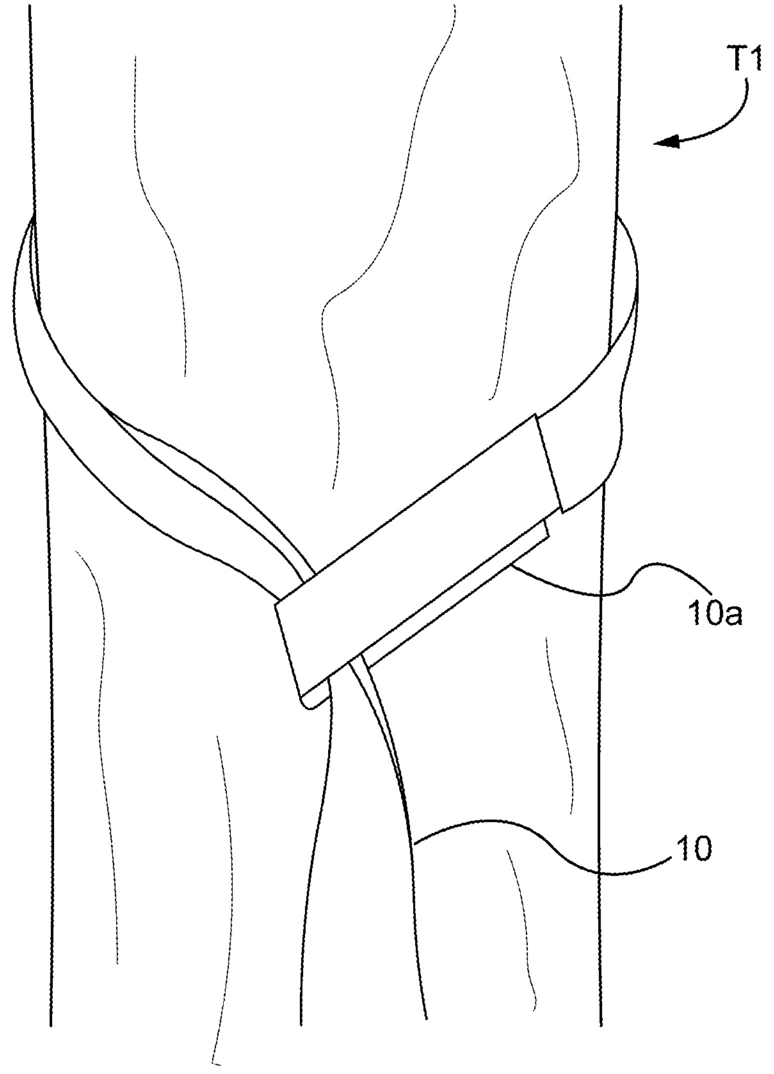
FIGS. 4A-4E are views illustrating a method of assembling the slackline activity device.
Figure 4B:
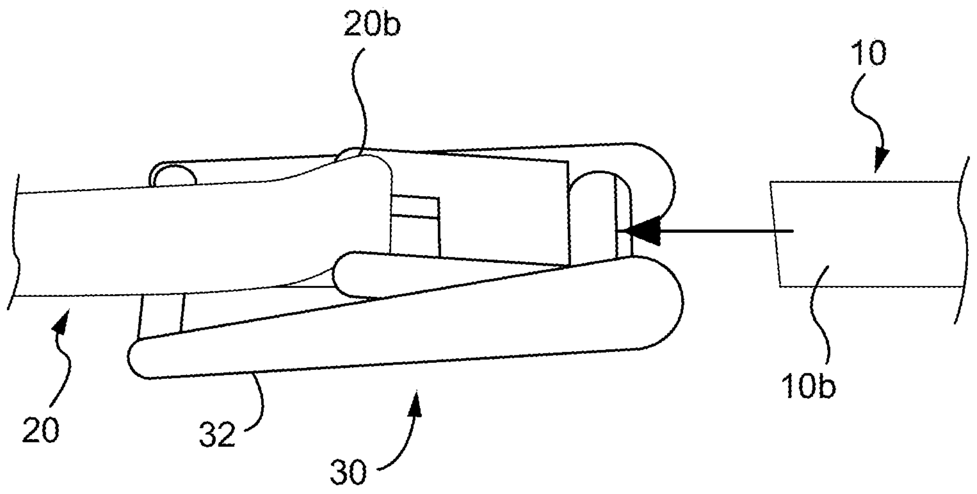
Figure 4C:
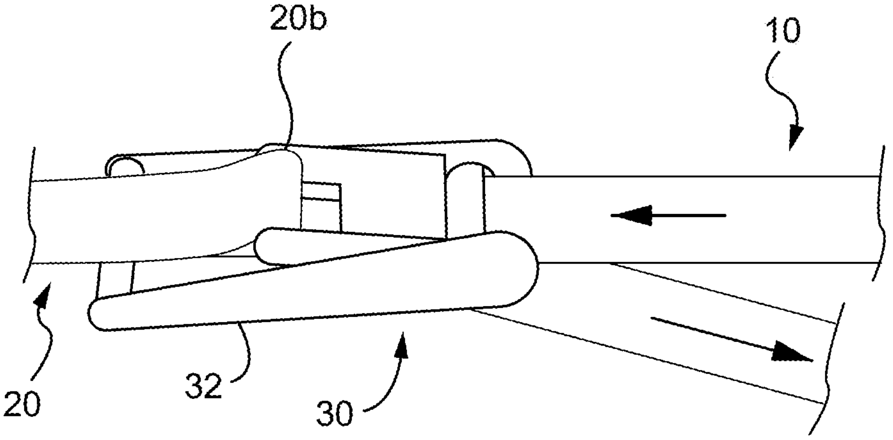
Figure 4D:
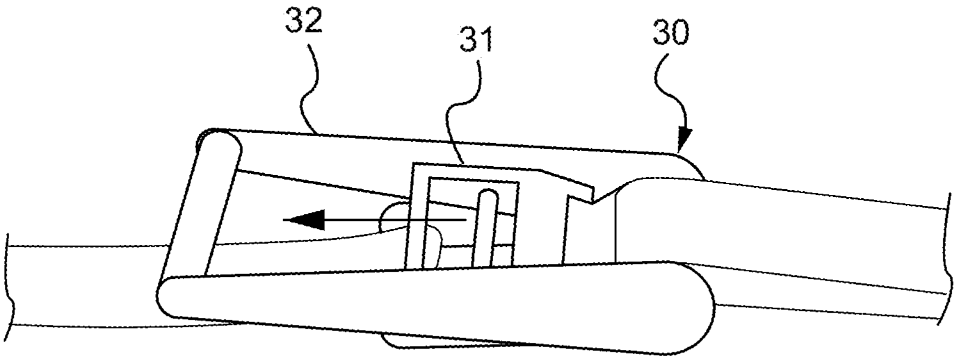
Figure 4E:
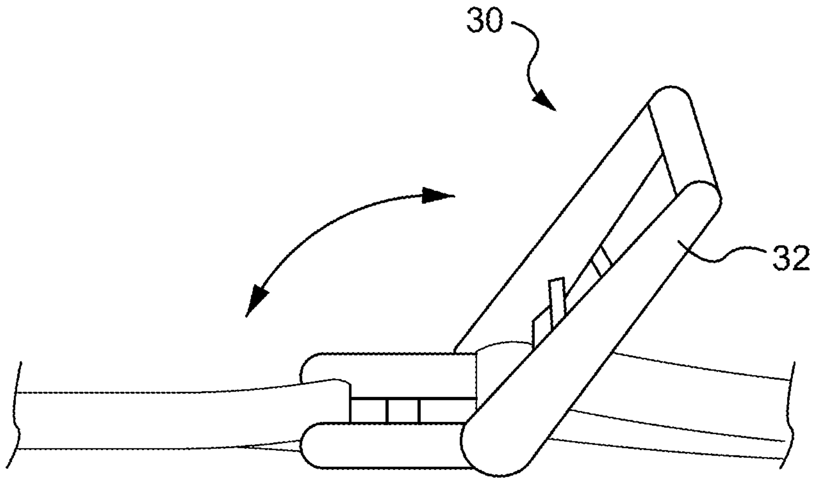
Figure 5:
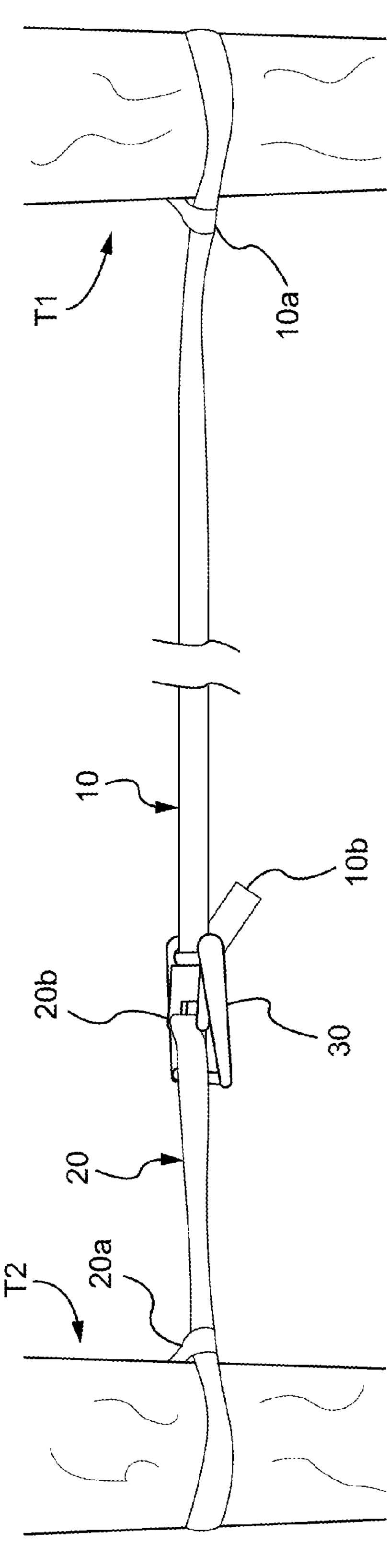
FIG. 5 is a view illustrating a portion of the slackline activity device as assembled.
Figure 6A:
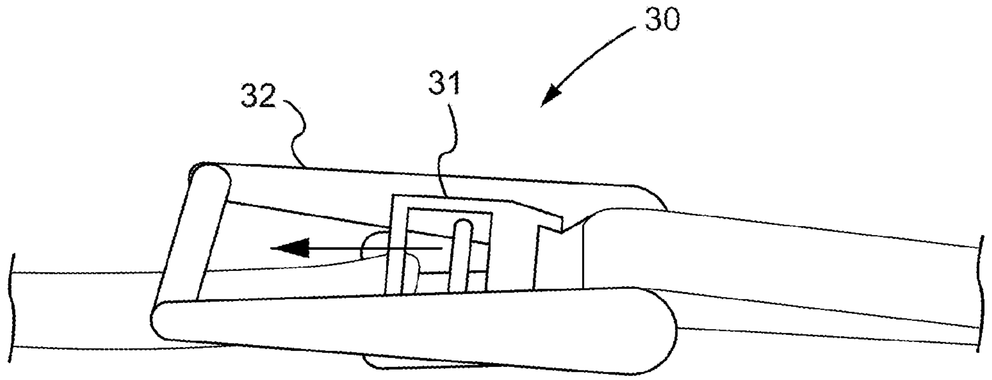
FIGS. 6A and 6B are views illustrating a method of disassembling the slackline activity device.
Figure 6B:
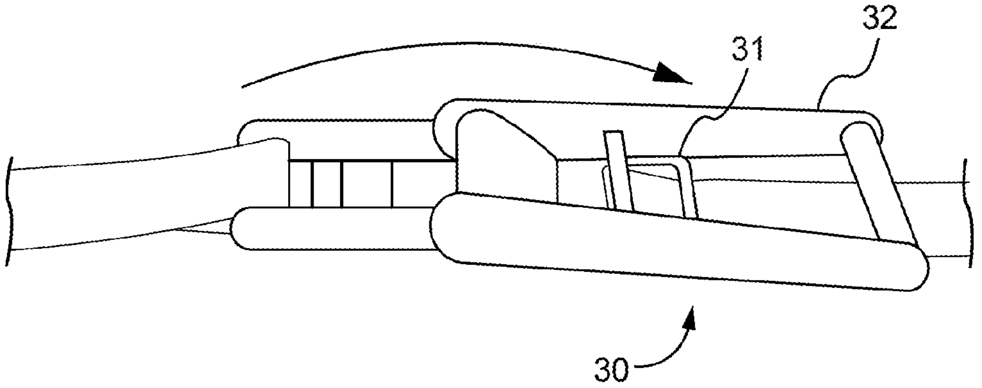

As shown in FIG. 4A, the main line 10 is wrapped around fixed object, such as a tree T1, and the second end 10*b* is fed through the loop 10*a* on the first end. Similarly, the anchor line 20 is wrapped around a fixed object, such as a tree T2, and the ratchet 30 attached to the second end 20*b* is fed through the loop 20*a* on the first end (not illustrated). As shown in FIGS. 4B and 4C, the second end 10*b* of the main line 10 is then fed into a first part of the ratchet 30, and is pulled out from a second part of the ratchet. Then, as shown in FIGS. 4D and 4E, the main line 10 and anchor line 20 are tightened by pulling a handle 31 of a lever 32 while moving the lever 32 in a reciprocating arced motion. As illustrated in FIG. 5, when tightened, the ratchet 30 firmly holds the main line 10 and anchor line 20 tautly between two fixed objects such as trees T1 and T2. As shown in FIGS. 6A and 6B, the main line 10 and anchor line 20 are released by pulling the handle 31 of the lever 32 and moving the lever 32 to a fully unfolded position. This will release the tension in the main line 10 and anchor line 20 for disassembly.

It is noted that, in the case of removable hangers 41, the hangers 41 may be installed in the pockets 16 of the main line 10 before or after tightening with the anchor line 20. It is additionally noted that although the ratchet 30 is fixed to the second end 20*b* of the anchor line 20 in the illustrated embodiment, the ratchet 30 may be fixed to the second end 10*b* of the main line 10 instead. In such a case, the second end 20*b* of the anchor line is inserted into the ratchet 30 and a similar procedure is followed.

Typically, the main line 10 and the anchor line 20 will be suspended at a height above the ground which is approximately 1-2 feet above the maximum height of the tallest intended user when their arms are extended over their head. For example, the main line 10 and the anchor line 20 are typically suspended approximately 5 feet to 10 feet above the ground. Suspending the main line 10 and the anchor line 20 at such a height allows the user to obtain the exercise benefit of suspending himself or herself above the ground such that his or her upper body muscles support the entirely of his or her body weight. Suspending the main line 10 and the anchor line 20 at such a height also ensures that if a user falls, an injury is unlikely to occur due to the relatively small distance from the user's feet to the ground.

While specific forms of the embodiment of the present invention have been shown in the aforementioned disclosure, these are merely illustrative of the invention but not limitative of the invention. It is contemplated that various modifications apparent to those skilled in the art could be made within the scope of the invention.

We claim:

1. A recreational device, comprising:

a main line including two elongated webbings having widths and lengths which at least partially overlap, the main line including a plurality of pockets, each pocket being a region where the two elongated webbings do not contact each other surrounded by two regions where the two elongated webbings contact each other, an anchor line including one elongated webbing, a ratchet which is provided at an end of either the main line or the anchor line, and at least one activity apparatus including a hanger, wherein the main line and the anchor line are configured to be suspended and held between two fixed objects by the ratchet, and are configured to be tightened by ratcheting the ratchet, and wherein the hanger of the at least one activity apparatus can be provided in one of the plurality of pockets.

2. The recreational device according to claim 1, wherein the hanger is an openable and closable loop, and is configured to be inserted into and removed from the one of the plurality of pockets.

3. The recreational device according to claim 2, wherein the hanger is a carabineer.

4. The recreational device according to claim 1, wherein the hanger is formed of a fabric.

5. The recreational device according to claim 1, wherein the hanger is a non-loop shape, and is configured to be inserted into and removed from the one of the plurality of pockets.

6. The recreational device according to claim 1, wherein each of the plurality of pockets is a region where the two elongated webbings are not fixed to each other, surrounded by two regions where the two elongated webbings are fixed to each other.

7. The recreational device according to claim 6, wherein the two elongated webbings are fixed to each other by sewing thread.

8. The recreational device according to claim 6, wherein the two elongated webbings are fixed to each other by rivets.

9. The recreational device according to claim 6, wherein the two elongated webbings are fixed to each other by adhesive.

10. The recreational device according to claim 1, wherein a first webbing of the two elongated webbings is wider than a second webbing of the two elongated webbings, wherein the first webbing includes a plurality of slits spaced along the length of the first webbing, wherein the second webbing is woven with the first webbing by passing the second webbing through the slits in the first webbing, and wherein the pockets correspond to vertical space between the first webbing and the second webbing.

11. The recreational device according to claim 1, wherein the hanger is a non-openable and closable loop, and wherein the hanger is non-removably disposed in the pocket.

12. The recreational device according to claim 1, wherein the at least one activity apparatus is selected from the group consisting of:

a fabric knot directly fixed to the hanger, a gymnastics ring indirectly fixed to the hanger, a bar indirectly fixed to the hanger such that the bar is configured to be suspended substantially parallel to the main line,
a resin ball indirectly fixed to the hanger,
a resin rod indirectly fixed to the hanger such that the resin rod is configured to be suspended substantially parallel to the main line, and
a resin cone indirectly fixed to the hanger.

13. A method of using the device according to claim 1, comprising:
suspending the main line and the anchor line between two fixed objects,
tightening the main line and the anchor line with the ratchet, and
inserting the at least one activity apparatus into one of the plurality of pockets,
wherein the main line and anchor line are configured such that a user can traverse part or all of the main line while holding the at least one activity apparatus.

14. The recreation method of claim 13,
wherein a loop is fixed to a first end of the main line and a second end of the main line is free,
wherein a loop is fixed to a first end of the anchor line and the ratchet is disposed on a second end of the anchor line,
wherein the main line is suspended between the two fixed objects by
wrapping the anchor line around a first fixed object of the two fixed objects,
inserting the ratchet through the loop of the anchor line,
wrapping the main line around a second of the two fixed objects,
inserting the second end of the main line through the loop of the main line,
inserting the second end of the main line into the ratchet, and
ratcheting the ratchet so as to tighten the main line between the two fixed objects.

15. The recreation method of claim 14,
wherein the main line and the anchor line are disposed at a position which is between 5 feet and 10 feet from the ground.

16. The recreation method of claim 13,
wherein the first fixed object of the two fixed objects is a tree, a pole, or a post,
wherein the second fixed object of the two fixed objects is a tree, a pole or a post.

17. The recreational method according to claim 13,
wherein the at least one activity apparatus is selected from the group consisting of
a fabric knot directly fixed to the hanger,
a gymnastics ring indirectly fixed to the hanger,
a bar indirectly fixed to the such that the bar is configured to be suspended substantially parallel to the main line,
a resin ball indirectly fixed to the hanger,
a resin rod indirectly fixed to the hanger such that the resin rod is configured to be suspended substantially perpendicular to the main line, and
a resin cone indirectly fixed to the hanger.

18. The recreational method according to claim 13, wherein the recreational method further comprises inserting the hanger into one of the plurality of pockets or removing the hanger from one of the plurality of pockets.

19. The recreational method according to claim 13, wherein the hanger is a carabineer.

20. A recreational device, comprising:
a main line including two elongated webbings having widths and lengths which at least partially overlap, the main line including at least one pocket, the at least one pocket being a region where the two elongated webbings do not contact each other surrounded by two regions where the two elongated webbings contact each other,
an anchor line including one elongated webbing,
a ratchet which is provided at an end of either the main line or the anchor line, and
at least one activity apparatus including a hanger,
wherein the main line and the anchor line are configured to be suspended and held between two fixed objects by the ratchet, and are configured to be tightened by ratcheting the ratchet, and
wherein the hanger of the at least one activity apparatus can be provided in the at least one pocket.

21. A method of using the device according to claim 20, comprising:
suspending the main line and the anchor line between two fixed objects,
tightening the main line and the anchor line with the ratchet, and
inserting the at least one activity apparatus into one of the at least one pocket,
wherein the main line and anchor line are configured such that a user can traverse part or all of the main line while holding the at least one activity apparatus.

* * * * *